2,816,890

HIGH MELTING INTERPOLYMERS OF MONO-VINYL AROMATIC COMPOUNDS

Massimo Baer, Springfield, Mass., assignor to Monsanto Chemical Company, St. Louis, Mo., a corporation of Delaware No Drawing. Application August 16, 1955, Serial No. 528,821

6 Claims. (Cl. 260—80.5)

The present invention relates to high melting interpolymers consisting of a monovinyl aromatic compound, an isopropenyl aromatic compound and a carboxyl containing monomer selected from the group consisting of acrylic acid, methacrylic acid, ethacrylic acid, and mixtures thereof.

Polystyrene and polymers of related monovinyl aromatic compounds such as vinyltoluene and 2,4-dimethylstyrene are extremely versatile thermoplastic resins that have been used extensively by the art. One of the shortcomings of these polymers is their relatively low heat distortion temperature. Many investigators have attempted to prepare interpolymers of monoyinvyl aromatic compounds having higher heat distortion temperatures, but have met with only indifferent success.

It is an object of this invention to provide new interpolymers of monovinyl aromatic compounds.

Another object of this invention is to provide new interpolymers of monovinyl aromatic compounds having high heat distortion temperatures.

A further object of this invention is to provide new interpolymers of monovinyl aromatic compounds which have high heat distortion temperatures and the desirable physical properties of homopolymers of monovinyl aromatic compounds.

Other objects and advantages of this invention will become apparent from the following detailed description thereof.

It has been discovered that extremely high heat distortion temperatures and other desirable properties are obtained in interpolymers consisting of, on a weight basis, 40–75% and preferably 50–70% of a monovinyl aromatic compound, 15–45% and preferably 25–40% of an isopropenyl aromatic compound, and 8–20% and preferably 10–15% of a carboxyl containing monomer selected from the group consisting of acrylic acid, methacrylic acid, ethacrylic acid, and mixtures thereof. Typical of the interpolymers of this invention are interpolymers of styrene, isopropenylbenzene and methacrylic acid.

The following example is set forth to more clearly illustrate the principle and practice of this invention to those skilled in the art. All parts are by weight.

EXAMPLE I

An interpolymer of styrene, isopropenylbenzene and methacrylic acid is prepared as follows:

One hundred eighty parts of water, one part of a sodium salt of an alkylaryl polyether sulfonate and 0.2 part of an alkylaryl polyether are charged to a reaction flask and heated to reflux. A catalyst solution consisting of 0.2 part of potassium persulfate in 20 parts of water and a monomer mixture consisting of 50 parts of styrene, 36 parts of isopropenylbenzene and 14 parts of methacrylic acid are added to the reaction flask at a steady rate over a three hour period while stirring and maintaining reflux. A 97% conversion is obtained and the residual monomers are removed by steam distillation. The polymer is recovered from the latex by drum drying and is compression molded to give moldings having the following physical properties:

Table I

| | |
|---|---|
| Heat Distortion Temperature ° C. | 140 |
| Tensile Strength, p. s. i. | 6770 |
| Percent elongation at break | 1.53 |
| Flexural strength, p. s. i. | 11,050 |

While the above example illustrates the preparation of an interpolymer of styrene, isopropenylbenzene and methacrylic acid, many variations can be made in the composition of the interpolymer without departing from the scope of the present invention. For example, all or part of the styrene may be replaced with other vinyl aromatic compounds such as vinyltoluene, vinylethylbenzene, 2,4-dimethylstyrene, o-chlorostyrene, 2,5-dichlorostyrene, etc. or mixtures thereof. Similarly, all or part of the isopropenylbenzene can be replaced with other isopropenyl aromatic compounds such as isopropenyltoluene, isopropenylethylbenzene, 2,4-dimethylisopropenylbenzene, o-chloroisopropenylbenzene, etc, or mixtures thereof. In lieu of methacrylic acid, acrylic or ethacrylic acid or mixtures thereof may be used.

The interpolymers of the invention may be polymerized by mass, solution or emulsion polymerization techniques. Since there is a tendency for the monomers to enter the growing polymer chains at different rates, it is preferred practice to add a mixture of monomers to the polymerization reaction at approximately the rate at which the polymerization is proceeding. As another alternative procedure, the monovinyl aromatic compound and isopropenyl aromatic compound can be interpolymerized with derivatives of acrylic, methacrylic and ethacrylic acid or mixtures thereof which are hydrolyzable to carboxyl groups. Examples of such derivatives include the nitriles, amides and esters of the acids of interest. The resulting interpolymers are subsequently hydrolyzed by well known methods to obtain interpolymers containing carboxyl groups.

The interpolymers of this invention may be used in fabricating rigid plastic articles such as combs, toys, refrigerator panels, plastic pipe, etc. The interpolymers are particularly useful when employed as one component of the polymeric blends disclosed and claimed in my copending application S. N. 517,920, filed June 24, 1955.

The above description and particularly the examples are set forth by way of illustration only and obviously many other modifications thereof can be made without departing from the spirit and scope of this invention.

What I claim is:

1. An interpolymer consisting of 40–75 weight percent of a monovinyl aromatic compound of the group consisting of styrene, vinyl toluene, and mixtures thereof, 15–45 weight percent of an isopropenyl aromatic compound of the group consisting of isopropenylbenzene, isopropenyltoluene, and mixtures thereof, and 8–20 weight percent of a monomer selected from the group consisting of acrylic acid, methacrylic acid, ethacrylic acid, and mixtures thereof.

2. An interpolymer consisting of 50–70 weight percent of a monovinyl aromatic compound of the group consisting of styrene, vinyl toluene, and mixtures thereof, 25–40 weight percent of an isopropenyl aromatic compound of the group consisting of isopropenylbenzene, isopropenyltoluene, and mixtures thereof, and 10–15 weight percent of a monomer selected from the group consisting of acrylic acid, methacrylic acid, ethacrylic acid, and mixtures thereof.

3. The method which comprises heating an aqueous solution containing an emulsifying agent and a free-radical generating catalyst to reflux and adding thereto a monomer mixture consisting of 40–75 weight percent of a monovinyl aromatic compound of the group consisting of styrene, vinyl toluene, and mixtures thereof, 15–45 weight percent of an isopropenyl aromatic compound of the group consisting of isopropenylbenzene, isopropenyltoluene, and mixtures thereof, and 8–20 weight percent of a monomer selected from the group consisting of acrylic acid, methacrylic acid, ethacrylic acid, and mixtures thereof, said monomer mixture being added at approximately the rate at which the polymerization is proceeding.

4. An interpolymer consisting of 40–75 weight percent styrene, 15–45 weight percent isopropenylbenzene and 8–20 weight percent methacrylic acid.

5. An interpolymer consisting of 50–70 weight percent styrene, 25–40 weight percent isopropenylbenzene and 10–15 weight percent methacrylic acid.

6. An interpolymer consisting of 50 weight percent styrene, 36 weight percent isopropenylbenzene and 14 weight percent methacrylic acid.

References Cited in the file of this patent

UNITED STATES PATENTS

| | | |
|---|---|---|
| 2,446,049 | Kropa | July 27, 1948 |
| 2,475,423 | Dickey et al. | July 5, 1949 |
| 2,604,457 | Segall | July 22, 1952 |
| 2,645,632 | Te Grotenhuis | July 14, 1953 |